United States Patent
Husted et al.

(10) Patent No.: US 8,817,925 B2
(45) Date of Patent: Aug. 26, 2014

(54) SYSTEM AND METHOD FOR RF SPUR CANCELLATION

(75) Inventors: Paul J. Husted, San Jose, CA (US); Michael P. Mack, Sunnyvale, CA (US); Srenik S. Mehta, Fremont, CA (US)

(73) Assignee: Qualcomm Incorporated, San Diego, CA (US), (*) Notice: Subject to any disclaimer, the term of this patent is extended or adjusted under 35 U.S.C. 154(b) by 116 days.

(21) Appl. No.: 13/422,875

(22) Filed: Mar. 16, 2012

(65) Prior Publication Data

US 2013/0243044 A1    Sep. 19, 2013

(51) Int. Cl.
*H03D 1/04* (2006.01)
*H03D 1/06* (2006.01)

(52) U.S. Cl.
USPC .......................................... 375/346; 375/316

(58) Field of Classification Search
USPC .......................................................... 375/346
See application file for complete search history.

(56) References Cited

U.S. PATENT DOCUMENTS

| | | | |
|---|---|---|---|
| 4,355,420 A | 10/1982 | Ishihara | |
| 5,918,167 A | 6/1999 | Tiller et al. | |
| 6,606,484 B1 | 8/2003 | Faulkner | |
| 7,042,960 B2 * | 5/2006 | Kintis | 375/308 |
| 7,949,323 B1 | 5/2011 | Muhammad et al. | |
| 2005/0020230 A1 | 1/2005 | Tanaka | |
| 2006/0093019 A1 * | 5/2006 | Gaikwad et al. | 375/139 |
| 2006/0280268 A1 | 12/2006 | Sobchak et al. | |
| 2007/0072571 A1 | 3/2007 | Sun et al. | |
| 2008/0089440 A1 * | 4/2008 | Curtis | 375/296 |
| 2008/0101212 A1 * | 5/2008 | Yu et al. | 370/208 |
| 2010/0244927 A1 * | 9/2010 | Aparin et al. | 327/363 |
| 2010/0296568 A1 * | 11/2010 | Bury | 375/227 |
| 2010/0330942 A1 * | 12/2010 | Choo et al. | 455/226.1 |
| 2011/0007839 A1 * | 1/2011 | Tang et al. | 375/296 |
| 2012/0213260 A1 * | 8/2012 | Froimovich et al. | 375/222 |

OTHER PUBLICATIONS

International Search Report and Written Opinion—PCT/US2013/032527—ISA/EPO—Jun. 20, 2013.

* cited by examiner

*Primary Examiner* — Erin File
(74) *Attorney, Agent, or Firm* — Bay Area Technology Law Group PC

(57) ABSTRACT

This disclosure is directed to a wireless device with a suppressor that couples to the aggressor signal of a frequency source to generate a cancelling signal for suppressing spurs resulting from operation of the frequency source. The amplitude and phase delay of the cancelling signal are adjusted to optimize the cancellation of the spur. Preferably, a calibration routine is performed to establish appropriate delay and amplitude values to cancel the spurs occurring at each device gain setting.

20 Claims, 4 Drawing Sheets

SYSTEM AND METHOD FOR RF SPUR CANCELLATION

FIELD OF THE PRESENT INVENTION

This disclosure generally relates to wireless communication systems and more specifically to systems and methods for reducing spurious radio frequency signals originating from oscillating frequency sources.

BACKGROUND OF THE INVENTION

Modern wireless communication systems rely heavily on the generation of accurate frequencies. For example, crystal oscillators are employed to generate reference frequencies for radio transmission and reception as well as to generate timing signals for digital circuits used by the transceiver. Phase locked loops (PLLs), employing a voltage controlled oscillator (VCO) controlled by a reference frequency, are used for frequency synthesis and modulation and other important applications. Although these frequency sources are a practical necessity for current communication systems, they create issues that must be addressed for the communication system to operate correctly. One notable characteristic of oscillating frequency sources such as crystal oscillators and PLLs is the potential for unwanted leakage of energy into other circuit elements, creating spurious signals or "spurs." The problems posed by these aggressor signals are exacerbated by trends in circuit design to integrate multiple analog and digital functions into a single chip, such as in system-on-a-chip (SOC) applications. As will be appreciated, spurs are particularly problematic when they are manifest in the analog passband and are downmixed with the desired signal, for example. Thus, electromagnetic coupling between the signal path and the frequency source may result in spurious tones appearing at a frequency corresponding to the aggressor signal. Coupling between data sources and the receiver input may also generate multiple spurs or an elevation of the noise floor.

Typically, it is necessary to compensate for these RF spurs to optimize the performance of the wireless system. Conventional techniques for canceling or mitigating these spurs involve a number of tradeoffs. Although the spurs can be processed within the digital baseband, such methods are not entirely satisfactory. For example, filters can be employed in the time or frequency domain to reduce the energy of the signal around the spur frequency. However, this attenuation also impacts the signal being received and is correspondingly detrimental to sensitivity.

Therefore, it would be desirable to provide systems and methods for cancelling or attenuating the spurs in an analog signal path of a wireless communication device. Further, it would be desirable to provide this suppression of the spurs by generating a cancelling signal having characteristics matched to the spur.

This invention accomplishes these and other goals.

SUMMARY OF THE INVENTION

In accordance with the above needs and those that will be mentioned and will become apparent below, this disclosure is directed to a method for operating a wireless communication device, wherein energy from one or more frequency sources of the device couples to an analog signal path and creates one or more spurs corresponding to the frequency sources, comprising generating at least one cancelling signal having a phase and amplitude with a suppressor configured to couple with energy from at least one of the frequency sources, adjusting the amplitude of the at least one cancelling signal to a level configured to suppress the spur corresponding to the at least one frequency source, adjusting the phase of the at least one cancelling signal to a delay configured to suppress the corresponding spur, and injecting the at least one cancelling signal into the signal path of the device. Preferably, the wireless signal is converted to baseband after injecting the first cancelling signal.

One aspect of the disclosure is directed to generating the at least one cancelling signal with a coupling portion. In embodiments wherein the at least one frequency source is implemented in an integrated circuit, the coupling portion preferably is provided in the same integrated circuit.

In a further embodiment, the method comprises injecting multiple cancelling signals into the signal path of the device, each having an adjusted phase and amplitude configured to suppress a corresponding spur. In such embodiments, the multiple frequency sources may include crystal oscillators and phase locked loops.

Yet another aspect of the disclosure is directed to adjusting the amplitude and phase of the at least one cancelling signal by retrieving amplitude and delay settings from a lookup table having entries for each gain setting of the device. Preferably, the device is calibrated at each gain setting in the absence of the wireless signal. Also preferably, the device is calibrated by sequentially applying varying phase delay to the at least one cancelling signal to determine a delay setting which corresponds to a local minimum in resulting spur energy. Further, the device is preferably calibrated by applying varying gain to the at least one cancelling signal to determine an amplitude setting which corresponds to a local minimum in resulting spur energy.

This disclosure is also directed to a wireless device comprising an analog signal path, one or more frequency sources, at least one suppressor and a suppressor processor, wherein energy from at least one of the frequency source couples with the signal path to create a spur, wherein the at least one suppressor is configured to couple with energy from the at least one frequency source to generate at least one cancelling signal and inject the cancelling signal into the signal path, and wherein the suppressor processor is configured to adjust the amplitude and phase delay of the at least one cancelling signal to suppress the spur. Preferably, the device further comprises an analog to digital converter configured to convert the wireless signal to digital baseband after the at least one cancelling signal is injected.

In one embodiment, the suppressor comprises a coupling portion. Preferably, the suppressor further comprises a programmable delay line and a programmable variable gain amplifier. In another aspect, the one or more frequency sources may include crystal oscillators and phase locked loops.

Another aspect of the disclosure is directed to implementing the device in an integrated circuit, wherein the a at least one frequency source and the coupling portion are in the same integrated circuit. Preferably, the coupling portion is located adjacent a circuit element in the signal path.

Yet another aspect of the disclosure includes a device with multiple suppressors, each configured to couple with energy one of the frequency sources to generate multiple cancelling signals that are injected into the signal path and wherein the suppressor processor is configured to adjust the amplitude and delay of the multiple cancelling signals to levels configured to suppress each corresponding spur.

In another embodiment, the suppressor processor is configured to retrieve amplitude and delay settings from a lookup table having entries for each gain setting of the device. Preferably, the device is calibrated at each gain setting to determine the amplitude and delay settings for the lookup table.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE INVENTION

Figure 1:
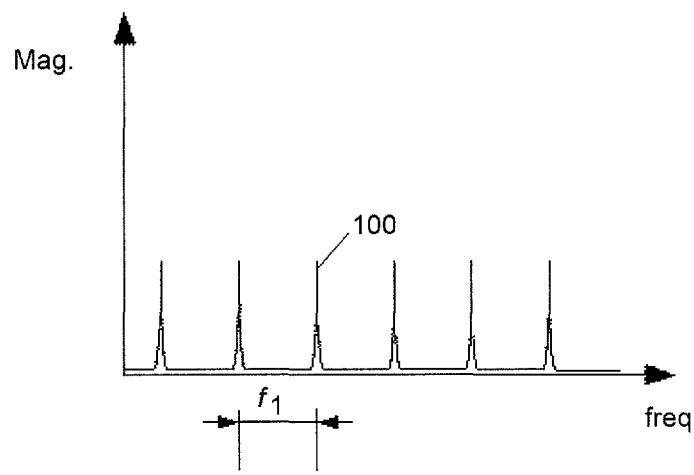
FIG. 1 is a chart showing spurs resulting from the operation of a crystal oscillator.

At the outset, it is to be understood that this disclosure is not limited to particularly exemplified materials, architectures, routines, methods or structures as such may, of course, vary. Thus, although a number of such option, similar or equivalent to those described herein, can be used in the practice of embodiments of this disclosure, the preferred materials and methods are described herein.

It is also to be understood that the terminology used herein is for the purpose of describing particular embodiments of this disclosure only and is not intended to be limiting.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of computer-executable instructions residing on some form of computer-usable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), and flash memory or any other medium that can be used to store the desired information.

In the figures, a single block may be described as performing a function or functions; however, in actual practice, the function or functions performed by that block may be performed in a single component or across multiple components, and/or may be performed using hardware, using software, or using a combination of hardware and software. Also, the exemplary wireless network devices may include components other than those shown, including well-known components such as a processor, memory and the like.

Unless defined otherwise, all technical and scientific terms used herein have the same meaning as commonly understood by one having ordinary skill in the art to which the disclosure pertains.

Further, all publications, patents and patent applications cited herein, whether supra or infra, are hereby incorporated by reference in their entirety.

Finally, as used in this specification and the appended claims, the singular forms "a, "an" and "the" include plural referents unless the content clearly dictates otherwise.

As referenced above, frequency sources critical to the design of modem wireless communication systems can lead to the generation of unwanted periodic signals due to coupling between circuit components. The leakage can take the form of magnetic coupling, for example involving one or more bondwires, or electric coupling that may involve the supply lines or the substrate. These resulting spurs occur at frequencies corresponding to their source and interfere with the proper operation of the communication system, such as when they are downmixed with the received signal.

A crystal oscillator operating as a frequency source produces a piezoelectric signal having a very precise frequency resulting from an induced mechanical resonance. As referenced above, this signal from the crystal oscillator is used for multiple purposes within a wireless communication device, including controlling one or more PLLs. However, due to leakage of the signal energy through coupling, spurs can appear in other circuits. As shown in FIG. 1, a series of reference spurs 100 are shown that may appear in the signal path at harmonic intervals of the operating frequency, $f_1$, of the oscillator. Although not shown, the harmonic spurs normally decay with frequency. Given the relatively clean signal source, spurs attributable to the operation of a crystal oscillator have a very narrow bandwidth and are schematically represented as such.

Figure 2:
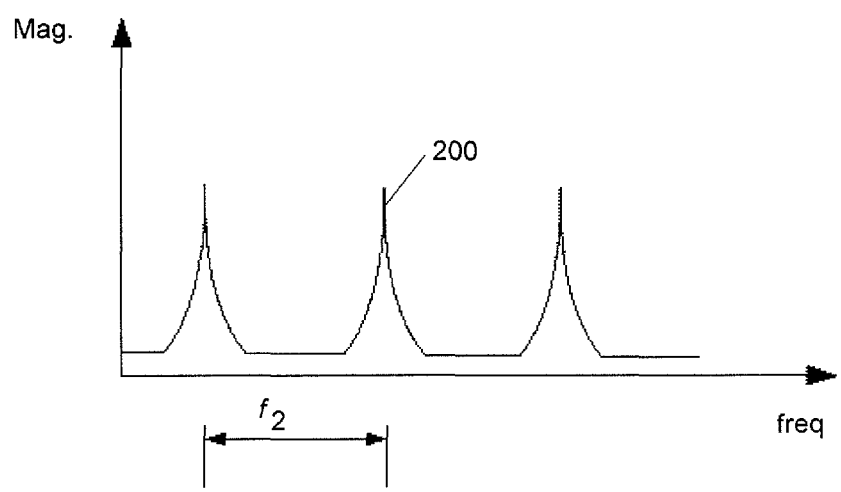
FIG. 2 is a chart showing spurs resulting from the operation of a PLL.

Since multiple and variable frequencies are employed in the operation of a typical wireless device, in addition to one or more crystal oscillators there are usually one or more PLLs, often controlled by the signal from a crystal oscillator. Even though the PLL may be controlled by a different frequency, it outputs a signal at its own frequency, typically a higher frequency. As a result, energy from the oscillating PLL signal can also leak and create spurs. FIG. 2 depicts a series of spurs 200 occurring in the signal path that may result from the operation of a PLL operating at a frequency, $f_2$. As can be seen, spurs 200 generally have a greater bandwidth, with a wider skirt than spurs 100. This can be attributed to the less accurate signal produced by a PLL, due in part to phase noise resulting from the loop bandwidth.

Accordingly, to prevent unwanted interference with processing the desired signal, both spurs 100 and spurs 200, as well as spurs attributable to other sources that appear in the signal path should be minimized. As discussed in detail below, the techniques of this disclosure may be employed to cancel, suppress or otherwise mitigate these spurs in the signal path despite the different characteristics.

Since the spurs result from aggressor signals that have the potential to affect any circuit elements present, the same coupling properties that generate the spurs may be employed to create a cancelling signal. As such, an exemplary wireless device according to this invention features one or more suppressors configured to inject a signal having equal amplitude and opposite phase of the spur into the signal path. Suitable suppressors include a coupling portion, an amplifier portion and a delay portion. The coupling portion is configured to inherently experience the same effect from the frequency source's leaking energy that generates the spur in the signal path. As a result, the leaking energy couples with the suppressor and generates a corresponding spur. For the purposes of this disclosure, the spur generated within the suppressor is referred to herein as a "cancelling signal." The amplifier portion is configured to adjust the gain of the cancelling signal generated by the suppressor to offset the amplitude of the spur. Further, the delay portion adjusts the phase of the cancelling signal, so that is preferably out of phase by 180° so as to effectively negate the spur. In particular, the techniques of this disclosure are configured to suppress the harmonic tone or tones resulting from operation of the frequency source that occur in-band to the receiver.

As will be appreciated, the characteristics of the cancelling signal are preferably configured to correspond to the desired application. For example, in a receiver employing the IEEE 802.11n protocol, it is desirable to cancel reference spurs in the 10 MHz WLAN channels. Since a typical oscillator in this application operates at 40 MHz, if a spur exists there will generally be only a single spur. The phase and gain adjustments discussed below effectively compensate for such a spur. In applications employing channels with a wider bandwidth, a greater number of spurs may be present and the shape of the cancellation waveform is preferably controlled. For example, other WLAN protocols may call for wider channels, such as 80 MHz channels, and be affected by two spurs. In such applications, it may be desirable to adjust the duty cycle. In applications using even wider bandwidths such that multiple harmonics of a spur are coupled into the channel, additional control over the shape of the cancelling signal is preferred.

Figure 3:
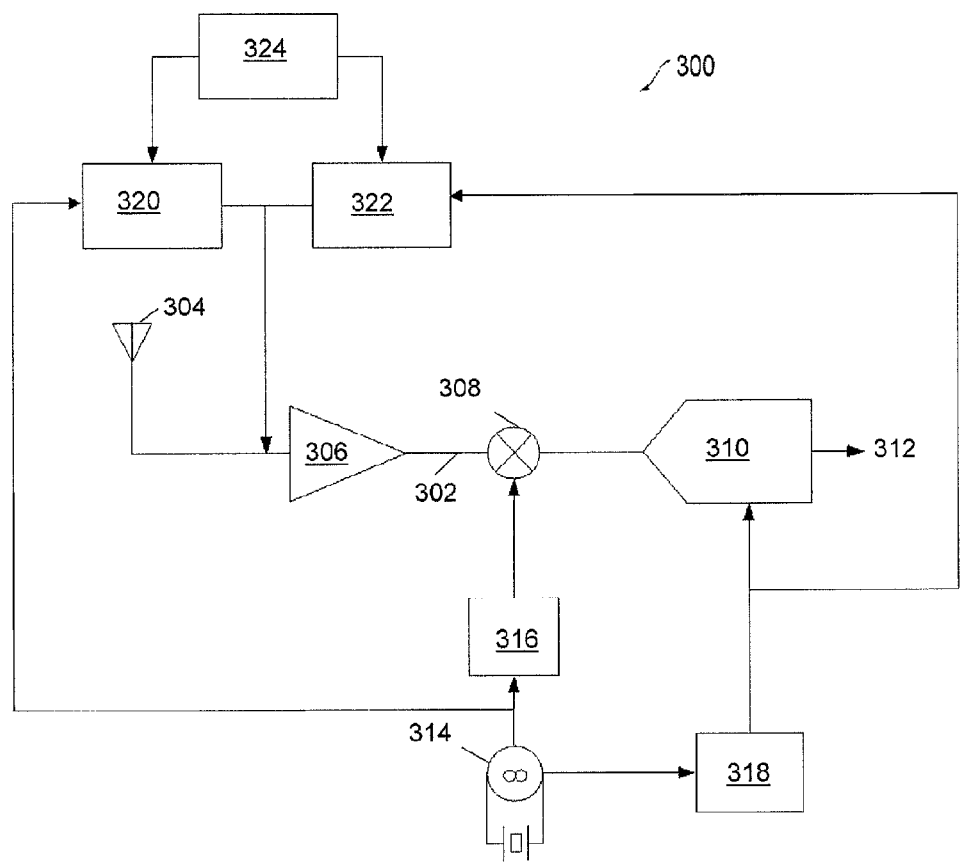
FIG. 3 is partial block diagram of a receiver having a suppressor configured to cancel spurs, according to one embodiment of the invention.

Turning now to FIG. 3, a partial block diagram showing the relevant functional portions of a wireless receiver 300 is depicted. In general, the analog signal path 302 of receiver 300 includes, without limitation, an antenna 304 that receives transmitted wireless signals which are then amplified by low noise amplifier (LNA) 306 and converted by mixer 308 to a frequency suitable for processing by analog-digital converter (ADC) 310 before being sent to the digital baseband 312 for further processing. In other embodiments, depending upon the design of receiver 300, analog signal path 302 may also include other conventional functional components, such as filters, switches, an automatic gain control (AGC) circuit, and the like. In the embodiment shown, crystal oscillator 314, operating at a first frequency, is used by synthesizer 316 to generate an input frequency for mixer 308. Crystal oscillator 314 is also used to control PLL 318, which operates at a second frequency to drive the sampling rate of ADC 310.

As represented in this embodiment, there are at least two frequency sources that have the potential to induce spurs in signal path 302, crystal oscillator 314 and PLL 318. From the discussion above, then, it will be seen that one set of spurs, having characteristics similar to those shown in FIG. 1, may occur at the first frequency, corresponding to crystal oscillator 314, and that a second set of spurs, having characteristics similar to those shown in FIG. 2, may occur at the second frequency, corresponding to PLL 318. To counteract these spurs, suppressors 320 and 322 are configured to generate cancelling signals.

Preferably, suppressors 320 and 322 are located relatively near LNA 306, so that they share similar physical conditions with LNA 306 and will experience relatively similar coupling effects due to signal leaking from the frequency sources. For example, in embodiments that are implemented as an integrated circuit, suppressors 320 and 322 are preferably part of the same chip and are positioned within the chip's architecture near LNA 306 at an appropriate orientation configured to expose the suppressors to the same coupling conditions as experienced by signal path 302. In the embodiment shown, suppressors 320 and 322 output their respective cancelling signals to signal path 302 preferably upstream from LNA 306, but can output downstream in other embodiments, as desired. For example, the embodiment shown involves mixing down to baseband after the cancelling signal is injected but designs in which the signal is digitized immediately after spur cancellation. Although the spurs generated by operation of the frequency sources may result from coupling at multiple locations on signal path 302, suppressors 320 and 322 preferably inject their cancelling signal to signal path 302 at a single point.

As discussed in detail below, suppressor 320 is configured to counteract spurs resulting from the operation of crystal oscillator 314 and suppressor 322 is configured to counteract spurs resulting from the operation of PLL 318. Suppressor processor 324 manages operation of suppressors 320 and 322 by setting the gain and phase of each cancelling signal to most effectively suppress the spurs.

Figure 4:
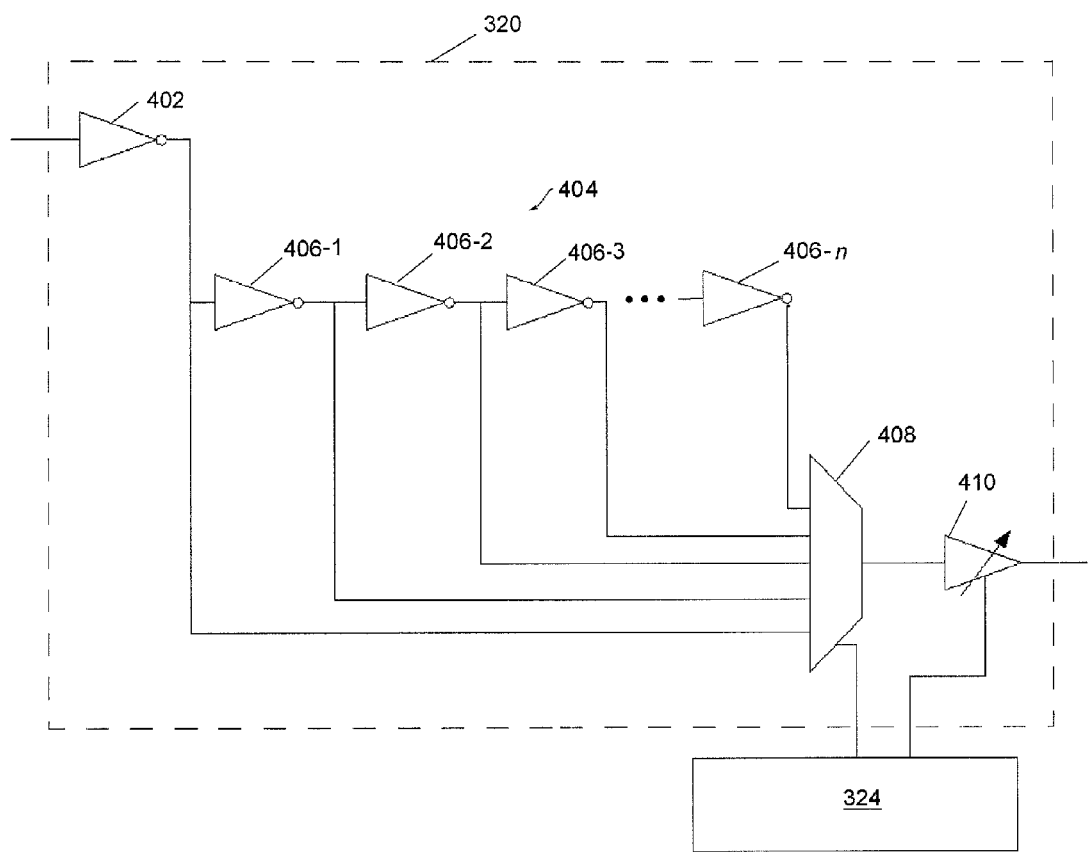
FIG. 4 is a detail of a suitable suppressor, according to one embodiment of the invention.

FIG. 4 shows a detail of one embodiment of a suitable design for suppressor 320. As shown, suppressor 320 includes a delay portion and a combined coupling and amplification portion.

Since suppressor 320 is configured to generate a cancelling signal corresponding to the spurs produced by the oscillator, it is connected to the output of crystal oscillator 314, such as by clock buffer inverter 402. The output from inverter 402 is then fed to the delay portion, here represented by a programmable delay line 404 that includes a cascading series of n inverters 406-1, 406-2, 406-3, ... 406-n, in which the output from each is fed to multiplexer 408. Each output produces an incrementally greater phase delay in the cancelling signal output by inverter 402, corresponding to its position in the series of inverters 406-1-406-n. Multiplexer 408 is controlled by suppressor processor 324, which selects the output of one of inverters 406-1-406-n to achieve the desired phase delay.

Next, the output from multiplexer 408 is fed to the coupling and programmable amplification portion, here represented by variable gain amplifier (VGA) 410. A cancelling signal will be induced in VGA 410 by energy leaking from crystal oscillator 314, since this circuit is subject to the same conditions that allow aggressor signals from crystal oscillator 314 to induce spurs in signal path 302. In integrated circuit implementations, it is desirable to position VGA 410 relatively close to LNA 306 to help ensure that the coupling effect that occurs in both circuits is substantially the same. Suppressor processor 324 adjusts the amplitude of the cancelling signal so that it offsets the spurs attributable to crystal oscillator 314. In other embodiments, it may be desirable to provide the coupling portion and the amplification portion with separate circuit elements. The coupling portion may include any circuit element that couples with energy leaking from the frequency source, allowing a corresponding cancelling signal to be generated.

The degree to which spurs will be suppressed depends in part on the resolution of amplification stages provided by VGA 410 and the resolution of the delay steps resulting from inverters 406-1-406-n as finer control over phase and gain allows a more precise calibration, as discussed below. Since the spurs being cancelled occur in-band, delay line 404 is preferably configured to operate over a delay range of one RF cycle.

As will be appreciated, the design of suppressor 322 may be substantially similar. With reference to receiver 300, suppressor 322 is preferably configured to generate a cancelling signal to mitigate a spur resulting from PLL 318, for example. Accordingly, the input of suppressor 322 is connected to the output of PLL 318. In general, it is preferably to employ designs that provide a suppressor for each frequency source that creates spurs due to energy leakage. Alternatively, a multiplexer or other similar circuit element may be used to controllably connect the suppressor to a plurality of aggressor frequency sources.

From the above discussion, it can be seen that effective suppression of the spurs depends upon setting the cancelling signal to the appropriate gain and phase delay. In one embodiment, suitable techniques for determining these adjustments involve the following calibration routine, discussed in reference to exemplary receiver 300. First, the spurs to be cancelled are identified. Since the coupling effects leading to the generation of spurs can be expected to vary depending upon factors such as the channel being received and the gain applied to signal path 302, calibration is preferably performed for each channel and each amplification level. As a practical matter, wireless receivers often employ a gain table to relate power levels within the dynamic range to the gain settings necessary to achieve those levels. The gain settings typically include the LNA 306 gain and may also provide values for RF VGA gain, active mixer gain, or others, depending upon the receiver design. Accordingly, in one embodiment, the calibration routine is performed for each gain setting in a gain table.

Figure 5:
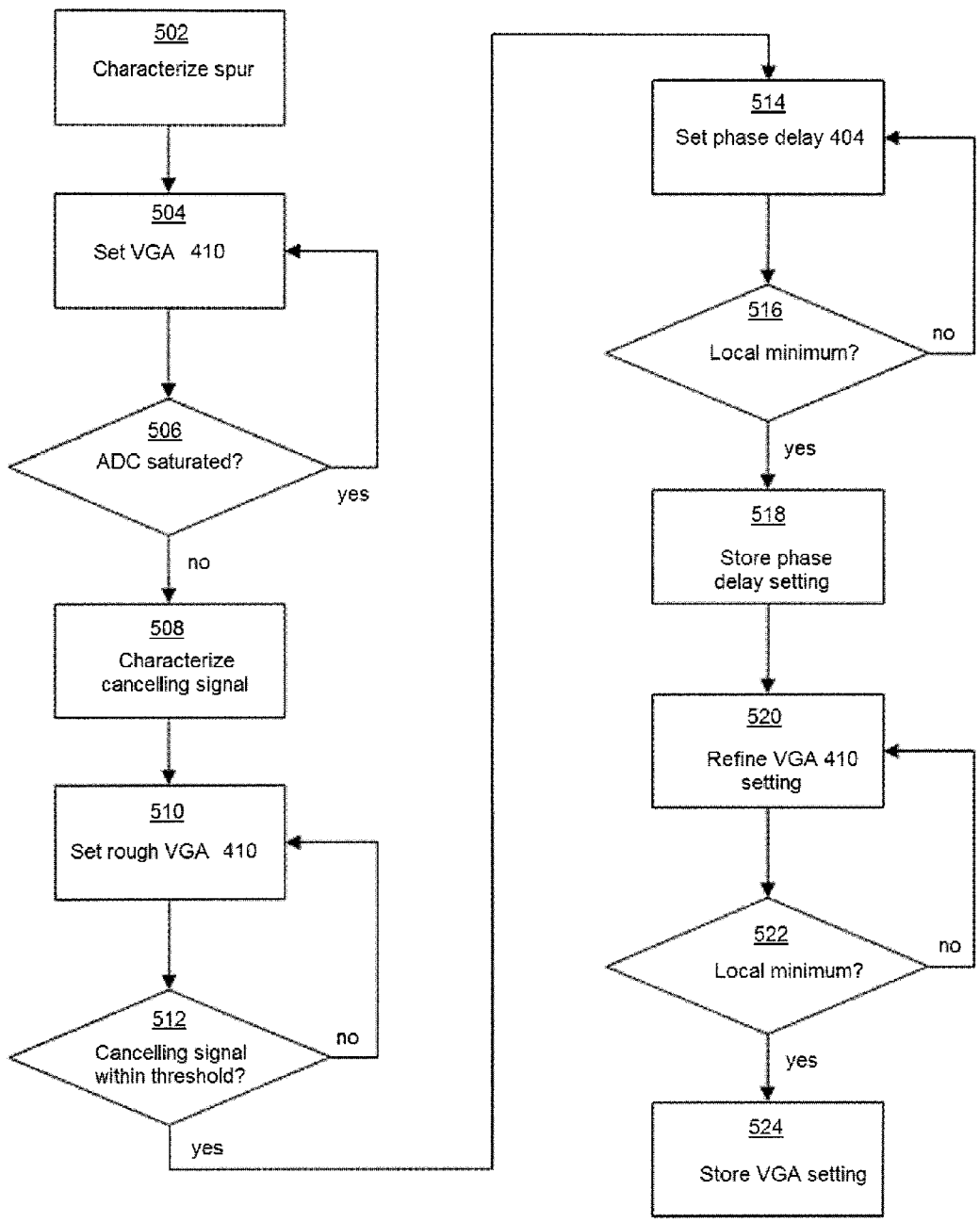
FIG. 5 is a flow chart depicting a suitable routine for calibrating a suppressor, according to one embodiment of the invention.

A suitable calibration routine for a given channel and gain setting is depicted in FIG. 5. Preferably, signal path 302 is isolated to prevent over-the-air signals from interfering with analysis of the spurs. This can be accomplished in any suitable manner, including disconnecting antenna 304 via an external transmit/receive switch, turning off any external LNA, or the like. By isolating the signal path, any signal appearing at the output of ADC 310 will correspond to a spurious signal, such as the spurs caused by energy leakage from crystal oscillator 314 or PLL 318, for example.

The process begins at step 502 and characterizes the strongest spur, of each type if multiple suppressors are employed. In one embodiment, the spur characteristics are determined by a spectral scan, for example by employing a Fast Fourier Transform (FFT) function. Alternatively, other suitable identification processes may be used, such as by performing a correlation with a complex tone, employing a bandpass filter and measuring energy, or their equivalent. In other embodiments, a given board or system design may be characterized to determine where the spurs are located, and what the aggressor signal is likely to be.

The calibration process continues and suppressor processor 324 engages suppressor 320 with VGA 410 set to a relatively high gain in step 504 to ensure that the generated cancelling signal has an amplitude sufficiently larger than the spur to facilitate calibration. If the initial setting of VGA 410 causes saturation at ADC 310 as determined in step 506, the process returns to step 504 and VGA 410 is preferably lowered to a more suitable level. Using the same identification technique, such as spectral scan, correlation, or the like, the relevant characteristics of the generated cancelling signal are determined in step 508, including determining the cancelling signal's amplitude and frequency. As will be appreciated, the frequency should match that of the spur, since the same energy leakage that creates the spur is used to generate the cancelling signal.

Next, suppressor processor 324 adjusts the gain of VGA 410 in step 510 to reduce the amplitude of the cancelling signal until it is approximately equal to the amplitude of the spur. This is achieved by comparing the cancelling signal and the spur in step 512 to determine if they are within a threshold amount. If not, the process returns to step 510 to adjust the gain of VGA 410 appropriately. If the difference is within the threshold, a rough gain determination has been made and suppressor processor 324 operates multiplexer 408 to sweep delay line 404 to adjust the phase of the cancelling signal in step 514. By analyzing the output of ADC 310, suppressor processor 324 checks for a local minimum in the spur's energy in step 516. The process loops to step 514 until the local minimum is achieved. Once the local minimum is determined, the setting corresponds to a phase delay for the cancelling signal that is approximately 180° out-of-phase with the spur and the phase delay is stored in step 518. In other words, suppressor processor 324 identifies the delay setting that most effectively negates the spur.

The process then continues to step 520 to further adjust VGA 410 so that suppressor processor 324 may refine the gain of the cancelling tone. Using the phase delay determined in step 518, VGA 410 is adjusted in a step-wise manner and the output of ADC 310 is checked for a local minimum in step 522. The process returns to step 520 until the local minimum is identified and the process then continues to step 524 to record the setting for VGA 410 that corresponds to the local minimum. This value corresponds to setting for VGA 410 which optimizes suppression of the spur.

At this stage, the calibration routine has established suitable phase and gain settings for suppressor 320 to effectively counteract the spur. Preferably, the routine confirms that suppression of the spur is occurring and that related spurs are not exacerbated. Having verified the phase and gain settings, these values can then be stored by suppressor processor 324 for subsequent use when receiver 300 is operated at the calibrated gain setting.

Accordingly, the routine discussed above can be seen to have established a phase and gain setting for suppressor 320 with respect to a spur resulting from the operation of crystal oscillator 314. A similar routine can then be performed to establish the appropriate phase and gain settings for suppressor 322 to counteract a spur resulting from the operation of PLL 318. Preferably, receiver 300 is designed to include a suppressor for each frequency source that that creates spurs and a calibration routine is performed for each spur and suppressor. Since each suppressor is separate, they can be calibrated and tuned individually for each spur source. Finally, the calibration routine may be performed for each operating channel of receiver 300 and for each gain setting that can be applied to the RF front end during operation of receiver 300.

As one of skill in the art will appreciate, temperature will affect the characteristics of both the spur and the generated cancelling signal. Accordingly, temperature during calibration is preferably monitored to ensure that it remains within an acceptable range. As necessary, recalibration can be performed when the temperature varies too greatly or external mechanisms for stabilizing temperature can be employed as desired.

In one embodiment, suppressor processor 324 preferably stores all calibration settings in a lookup table referenced against all possible gain settings for receiver 300. Accordingly, during normal operation of receiver 300, suppressor processor 324 applies the corresponding calibration settings to adjust the gain and phase of the cancelling signal produced by suppressors 320 and 322. Embodiments employing additional suppressors may use the same technique.

Further, the calibration routine is discussed above as being implemented by suppressor processor 324. However, one of skill in the art will appreciate that one or more aspects of the calibration functions may also be performed using an external device, leaving suppressor processor 324 primarily responsible for simply applying suitable phase and gain settings for the cancelling signal.

In yet other embodiments, suppressor processor 324 may be configured to monitor the quality of the received signal and to adjust the amplitude and phase parameters of suppressors 320 and 322 to optimize one or more signal characteristics during reception. As will be appreciated, such embodiments may not require a calibration routine and may be less affected by changes in environmental conditions.

Although receiver 300 is depicted as having a direct conversion configuration, so that the RF signal is mixed directly to baseband frequency, the techniques of this disclosure apply equally to other receiver designs, such a superheterodyne receivers, that may employ one or more intermediate frequencies (IF). In addition, depending upon the receiver architecture, additional frequency sources, such as other crystal oscillators or PLLs, that can also cause spurs, may be present. However, each additional spur source may be cancelled using the above practices. Similarly, corresponding techniques can also be used to suppress spurs in a transmit chain, as well. Since transmission signals are typically much larger in magnitude than received signals, additive spurs correspondingly have less effect. Nevertheless, spurs in the local oscillator (LO) path may interfere with transmission and may be cancelled in a similar way, by placing a coupling element near the LO signals.

As discussed above with regard to FIGS. 1 and 2, the spurs originating from different frequency source generally have different characteristics, in addition to amplitude or phase. For example, spurs resulting from a crystal oscillator have a sharp profile while spurs resulting from a PLL have a wider skirt. Despite the differing characteristics, the suppression techniques of the disclosure apply equally well to each spur as long as the cancellation signal is generated by the proper aggressor to combat the given spur. Since the cancelling signal is generated in the same manner as the spur itself, it will inherently have substantially the same characteristics, including aspects such as phase noise. It will be appreciated that this technique represents a number of advantages over other methods of spur cancellation, particularly those that do not tailor the characteristics of the cancelling signals to the differing characteristics of the spurs or that attempt to reproduce those characteristics artificially.

Described herein are presently preferred embodiments. However, one skilled in the art that pertains to the present invention will understand that the principles of this disclosure can be extended easily with appropriate modifications to other applications.

What is claimed is:

1. A method for operating a wireless communication device, wherein energy from one or more frequency sources of the device couples to an analog signal path and creates one or more spurs corresponding to the one or more frequency sources, comprising:
   generating at least one cancelling signal having a phase and amplitude with a suppressor configured to couple with energy from at least one of the frequency sources;
   adjusting the amplitude of the at least one cancelling signal to a level configured to suppress the spur corresponding to the at least one frequency source;
   adjusting the phase of the at least one cancelling signal to a delay configured to suppress the corresponding spur; and
   injecting the at least one cancelling signal into the analog signal path of the device.

2. The method of claim 1, further comprising converting a wireless signal to baseband after injecting the at least one cancelling signal.

3. The method of claim 1, wherein generating at least one cancelling signal with a suppressor comprises generating the at least one cancelling signal with a coupling portion.

4. The method of claim 3, wherein the at least one frequency source is implemented in an integrated circuit, further comprising providing the coupling portion in the same integrated circuit.

5. The method of claim 1, further comprising injecting multiple cancelling signals, each having an adjusted phase and amplitude configured to suppress a corresponding spur.

6. The method of claim 1, wherein the one or more frequency sources are selected from a group consisting of crystal oscillators and phase locked loops.

7. The method of claim 1, wherein adjusting the amplitude and phase of the at least one cancelling signal comprise retrieving amplitude and delay settings from a lookup table having entries for each gain setting of the device.

8. The method of claim 7, further comprising calibrating the device at each gain setting in the absence of a wireless signal.

9. The method of claim 8, wherein calibrating the device comprises sequentially applying varying phase delay to the at least one cancelling signal to determine a delay setting which corresponds to a local minimum in resulting spur energy.

10. The method of claim 9, further comprising applying varying gain to the at least one cancelling signal to determine an amplitude setting which corresponds to a local minimum in resulting spur energy.

11. A wireless device comprising an analog signal path, one or more frequency sources, at least one suppressor and a suppressor processor, wherein energy from at least one of the frequency sources couples with the analog signal path to create a spur, wherein the at least one suppressor is configured to couple with energy from the at least one frequency source to generate at least one cancelling signal and inject the at least one cancelling signal into the analog signal path, and wherein the suppressor processor is configured to adjust an amplitude and phase delay of the at least one cancelling signal to suppress the spur.

12. The wireless device of claim 11, wherein the device further comprises an analog to digital converter configured to convert a wireless signal to digital baseband after the at least one cancelling signal is injected.

13. The wireless device of claim 11, wherein the suppressor comprises a coupling portion.

14. The wireless device of claim 13, wherein the suppressor further comprises a programmable delay line and a programmable variable gain amplifier.

15. The wireless device of claim 11, wherein the one or more frequency sources are selected from a group consisting of crystal oscillators and phase locked loops.

16. The wireless device of claim 13, wherein the at least one frequency source is implemented in an integrated circuit and wherein the coupling portion is in the same integrated circuit.

17. The wireless device of claim 16, wherein the coupling portion is located adjacent to a circuit element in the analog signal path.

18. The wireless device of claim 11, further comprising multiple suppressors, wherein each suppressor is configured to couple with energy from one of the frequency sources to generate a cancelling signal that is injected into the signal path, wherein the suppressor processor is configured to adjust the amplitude and delay of the cancelling signal of each suppressor to levels configured to suppress each corresponding spur.

19. The wireless device of claim 11, wherein the suppressor processor is configured to retrieve amplitude and delay settings from a lookup table having entries for each gain setting of the device.

20. The wireless device of claim 19, wherein the device is calibrated at each gain setting to determine the amplitude and delay settings for the lookup table.

* * * * *